US012683531B2

(12) United States Patent
Eskola

(10) Patent No.: US 12,683,531 B2
(45) Date of Patent: Jul. 14, 2026

(54) METHOD AND ARRANGEMENT FOR OPERATING PUMP SYSTEM

(71) Applicant: ABB Schweiz AG, Baden (CH)

(72) Inventor: Matti Eskola, Helsinki (FI)

(73) Assignee: ABB SCHWEIZ AG, Baden (CH)

( * ) Notice: Subject to any disclaimer, the term of this patent is extended or adjusted under 35 U.S.C. 154(b) by 240 days.

(21) Appl. No.: 18/668,353

(22) Filed: May 20, 2024

(65) Prior Publication Data

US 2024/0405705 A1 Dec. 5, 2024

(30) Foreign Application Priority Data

Jun. 2, 2023 (EP) ..................................... 23176991

(51) Int. Cl.
| | |
|---|---|
| *H02P 23/07* | (2016.01) |
| *F04D 15/00* | (2006.01) |
| *H02P 27/04* | (2016.01) |

(52) U.S. Cl.
CPC .......... *H02P 23/07* (2016.02); *F04D 15/0066* (2013.01); *H02P 27/045* (2013.01)

(58) Field of Classification Search
CPC ..... H02P 23/07; H02P 27/045; F04D 15/0066
See application file for complete search history.

(56) References Cited

U.S. PATENT DOCUMENTS

| | | | | |
|---|---|---|---|---|
| 11,913,444 B2* | 2/2024 | Hoefel | ................ | F04D 15/0066 |
| 2004/0064292 A1* | 4/2004 | Beck | ....................... | F04B 47/02 |
| | | | | 702/182 |
| 2008/0067116 A1* | 3/2008 | Anderson | ................ | G01F 1/80 |
| | | | | 702/45 |

FOREIGN PATENT DOCUMENTS

EP 3522359 A1 8/2019

OTHER PUBLICATIONS

Anonymus; LENZE Operating instructions 8200 motec frequency inverters; Dec. 29, 2010; Retrieved from the Internet; URL:http://www.chastotniki.ru/Lenze/8200mo tec_en.pdf; 234 Pages.
European Search Report; Application No. EP23176991; Completed: Nov. 15, 2023; 3 Pages.

* cited by examiner

*Primary Examiner* — Zoheb S Imtiaz
(74) *Attorney, Agent, or Firm* — Greenberg Traurig, LLP

(57) ABSTRACT

A method and apparatus for operating a pump system comprising a rotary pump, a three-phase induction motor operably coupled to the rotary pump, and an AC drive operably coupled to the induction motor, the apparatus being configured to supply the induction motor with a three-phase AC voltage at multiple different angular velocities, monitor an output current of the AC drive generated in response to the supplied voltage at the multiple different angular velocities, determine an angular velocity of the supplied voltage at which at least one predetermined characteristic in the monitored output current is detected and determine a rotational velocity corresponding to the determined angular velocity as an estimate of the rotational velocity of the motor, wherein the pump system is operated on the basis of the determined estimate of the rotational velocity of the motor.

17 Claims, 5 Drawing Sheets

METHOD AND ARRANGEMENT FOR OPERATING PUMP SYSTEM

TECHNICAL FIELD

The present invention relates to operating a pump system, and more particularly to operating a pump system comprising a rotary pump, a three-phase induction motor operably coupled to the rotary pump, and an AC drive operably coupled to the induction motor.

BACKGROUND

Pumps for pumping e.g. liquid or gas may be used in various applications. As an example, so-called Electric Submersible Pumps (ESP) may be used in oil and gas industry to lift crude oil from oilwells to a ground level. The pump and the motor rotating the pump may be integrated, and such a combination can be located underground and/or undersea at a level of an oil deposit, for instance. The pump motor cable can be even several kilometers long. To reduce the motor current and/or the cable diameter, ESPs may be run by medium voltage motors. However, low voltage converter devices, such as AC drives, are often used for controlling the motors. In such a case, there may be a step-up transformer between the ESP motor and the converter device. The converter device and the possible step-up transformer may be located at ground or sea surface level, for example.

When the pump is stopped, oil may start to flow downwards by gravity. Sometimes, there may be more pressure in the oilwell and oil can also flow upwards naturally, even if the ESP is not running. If oil is flowing in a borehole, for example, the pump may be rotating even if the converter device is off, i.e. not feeding the motor. An ESP start may not be recommended if the pump is rotating fast, for instance. Starting with a rotating pump can stress the mechanics and reduce the ESP lifetime. Before pump start command, it is thus desirable to know whether the pump is rotating or not.

It is possible to measure pump rotational velocity (or its absolute value, i.e. rotational speed) directly by means of a rotary encoder, for example. However, if the pump unit including the motor are located in a hard-to-reach location, then such additional sensors and devices may not be desirable as the maintenance thereof may be burdensome. Moreover, sometimes just a predefined delay may be used between a stop of the pump and the next start command. However, such waiting time is not a very good solution because conditions can change during the waiting time inside the oil well or similar location.

SUMMARY

An object of the present invention is thus to provide a method and an apparatus for implementing the method so as to overcome the above problems or at least to alleviate them. The objects of the invention are achieved by a method, a computer program product, and an apparatus, which are characterized by what is stated in the independent claims. The preferred embodiments of the invention are disclosed in the dependent claims.

The invention is based on the idea of estimating a rotational velocity of an induction motor rotating a rotary pump, the estimating comprising supplying, by an AC drive, the induction motor with a three-phase AC voltage at multiple different angular velocities, monitoring an output current of the AC drive generated in response to the supplied voltage at the multiple different angular velocities, determining an angular velocity of the supplied voltage at which at least one predetermined characteristic in the monitored output current is detected, and determining a rotational velocity corresponding to the determined angular velocity as an estimate of the rotational velocity of the motor. Then the pump system is operated on the basis of the determined estimate of the rotational velocity of the motor.

An advantage of the solution of the invention is that the motor rotational velocity, and hence also the pump rotational velocity or speed, can be estimated sufficiently accurately to determine whether the motor and the pump are rotating too fast or not and to operate the pump system accordingly without needing any additional sensors or measuring device. Consequently, the pump system reliability can be increased with lower cost.

BRIEF DESCRIPTION OF THE DRAWINGS

In the following the invention will be described in greater detail by means of preferred embodiments with reference to the accompanying drawings, in which.

DETAILED DESCRIPTION

The following embodiments are exemplary. Although the description may refer to "an", "one", or "some" embodiment(s) in several locations, this does not necessarily mean that each such reference is to the same embodiment(s), or that the feature only applies to a single embodiment, for example. Single features of different embodiments may also be combined to provide other embodiments. Generally, all terms and expressions used should be interpreted broadly and they are intended to illustrate, not to restrict, the embodiments. The figures only show components necessary for understanding the various embodiments. The number and/or configuration of the various elements, and generally their implementation, could vary from the examples shown in the figures.

Different embodiments and examples may be described below using single units, models, equipment and memory, without restricting the embodiments/examples to such a solution. Concepts called cloud computing and/or virtualization may be used. The virtualization may allow a single physical computing device to host one or more instances of virtual machines that appear and operate as independent computing devices, so that a single physical computing device can create, maintain, delete, or otherwise manage virtual machines in a dynamic manner. It is also possible that any device operations will be distributed among a plurality of servers, nodes, devices or hosts, for example. In possible cloud computing network devices, computing devices and/ or storage devices may provide shared resources. Some other technology advancements, such as Software-Defined Networking (SDN), may cause one or more of the functionalities described below to be migrated to any corresponding abstraction or apparatus or device. Therefore, all words and expressions should be interpreted broadly, and they are intended to illustrate, not to restrict, the embodiment in question.

Figure 1:
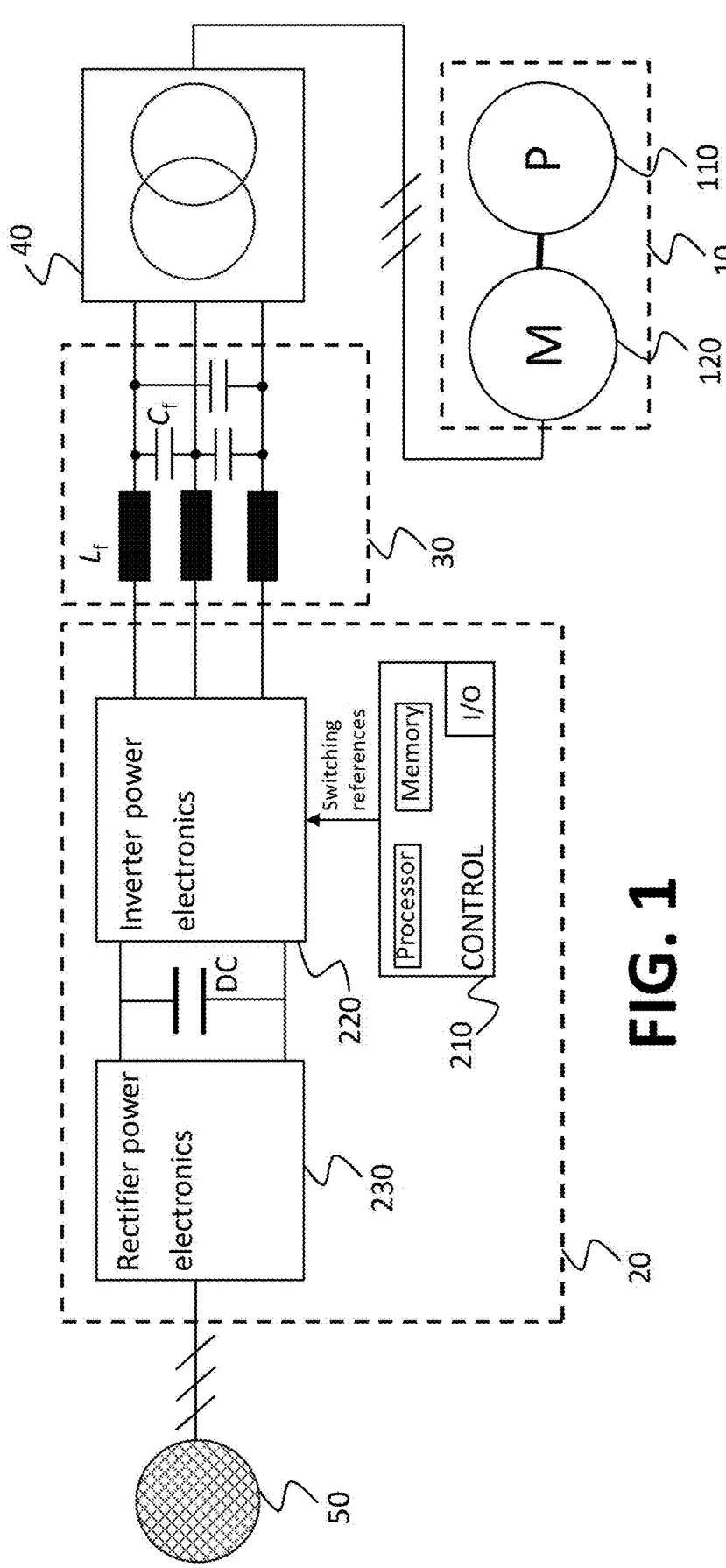
FIG. 1 illustrates a pump system according to an embodiment.

A general architecture of a system in which various embodiments of the invention may be applied is illustrated in FIG. 1. FIG. 1 is a simplified block diagram of an exemplary system showing some equipment (e.g. apparatuses, devices, nodes) and functional entities, whose implementation and/or number and/or configuration may differ from what is shown in the example of FIG. 1. The actual physical connections between the various elements may vary from the example shown. Such a system may also comprise other equipment, functional entities and/or structures, some of which may be used in or for e.g. data management and communication in the system or in any part of the system, for example. Also e.g. any communications protocols used may vary and may depend on the system characteristics, for instance.

The exemplary pump system of FIG. 1 comprises a rotary pump 110 and a three-phase induction motor (asynchronous AC motor) 120 operably coupled to the rotary pump 110 to rotate the pump. The rotary pump may be of any type depending on the system and purpose for which it is used. The pump 110 may be configured to pump liquid, such as oil or water, or gas, such as air, for example. The pump 110 and the motor 120 may be separate physical units or they may be provided as an integrated pumping unit 10, for instance. The exemplary pump system further comprises an AC drive (variable frequency drive, variable speed drive) 20 operably coupled to the induction motor 120 to control the motor. Consequently, the pump 110 can be controlled and operated via the AC drive 20 and the motor 120. Contrary to some definitions of term "drive", the motor 120 which is driven does not form a part of the drive 20 itself in the context of this disclosure. A non-limiting list of examples of sites or applications, in which the disclosed pump system may be utilized, includes oil and gas production systems, power plants, manufacturing plants, chemical processing plants, mining and mineral processing plants, ships and other vehicles, and utility plants.

The AC drive 20 generally may comprise one or more electric power converter units or modules, such as rectifiers, inverters or frequency converters, for example. In the example of FIG. 1, the AC drive 20 comprises an inverter 220 and a control arrangement 210, for controlling the motor 120 by feeding it from a DC power supply. Herein term 'inverter' generally refers to an electronic device or circuitry that is able to convert direct current to alternating current. An example of the inverter is a semiconductor bridge implemented by means of controllable semiconductor switches, such as IGBTs (Insulated-Gate Bipolar Transistor) or FETs (Field-Effect Transistor), which are controlled according to a modulation or control scheme used. The control of the motor 120 may be generally implemented by means of the AC drive 20 by utilizing the so-called scalar control (also known as frequency control or V/Hz control), where an AC drive 20 output voltage (vector) of given magnitude is rotated at a given frequency (or equivalently angular speed), for example. Thus, the scalar control mode, or control technique, uses parameters generated outside of the motor 120 as controlling variables, namely voltage and frequency. Both the voltage and frequency reference are fed into a modulator (217 in FIG. 2), which can simulate an AC sine wave and feed corresponding essentially sinusoidal three-phase voltage to the motor's stator windings. This technique commonly called pulse width modulation (PWM) utilizes the fact that there is an essentially constant intermediate DC voltage supply. The three phases are denoted with letters a, b and c. In the example of FIG. 1, the AC drive 20, or more specifically the inverter 220 and the control arrangement 210, may be configured to be operated in the scalar control mode at least during the normal operation of the pump system. In the example, the control arrangement 210 is configured to provide the switching references to the controllable semiconductor switches of the inverter circuit 220 to provide the desired output AC voltage of given magnitude and frequency. The inverter 220 can thus control the motor 120 in the form of a PWM pulse train dictating both the output AC voltage magnitude and frequency. This control mode does not need to use a feedback device which takes speed or position measurements from the motor's shaft. The exemplary AC drive 20 in FIG. 1 also comprises a rectifier 230 providing a power supply to the DC intermediate circuit from a three-phase power grid 50. Thus, the AC drive 20 may comprise a frequency converter. The exemplary control arrangement 210 of the AC drive 20 may be used to control the AC drive and components thereof, e.g. the inverter 220, and consequently, the motor 120, and the operation of the pump 110. The control arrangement 210 may be physically a separate unit or am integrated part of the AC drive 20 or some other unit, for example. The control arrangement 210 may comprise a processor and a memory. Moreover, control arrangement 210 may further comprise suitable I/O (Input-Output) means, such as a keyboard and/or a display and/or another separate terminal unit, which may be connected to the control arrangement 210 in a wired and/or wireless manner. Thus, an operator or a user of the pump system can operate the pump through such I/O means of the control arrangement 210 and/or connected thereto, for instance. The exemplary system of FIG. 1 further shows an output filter 30 of the AC drive 20, such as an LC filter with inductance $L_f$ and capacitance $C_f$, and a step-up transformer 40. However, these units could be omitted depending on the system and application in question.

In the example illustrated in FIG. 1, the AC drive 20 may be a low voltage (generally <1000 V) device and the motor 120 may be a medium (or high) voltage (>1000 V) motor. However, it is also possible that both the AC drive 20 and the motor 120 are either low voltage devices or medium (or high) voltage devices, for example. Moreover, the combination 10 of the pump 110 and the motor 120 could be an Electric Submersible Pump (ESP), which may be used in oil and gas industry to lift crude oil from oilwells to a ground level. The pump and the motor combination 10 can be located underground and/or undersea at a level of an oil deposit, for instance. the possible step-up transformer may be located at ground or sea surface level, for example. The pump motor cable between the step-up transformer 40 and the motor 120 can be several hundred meters or kilometres long.

Figure 2:
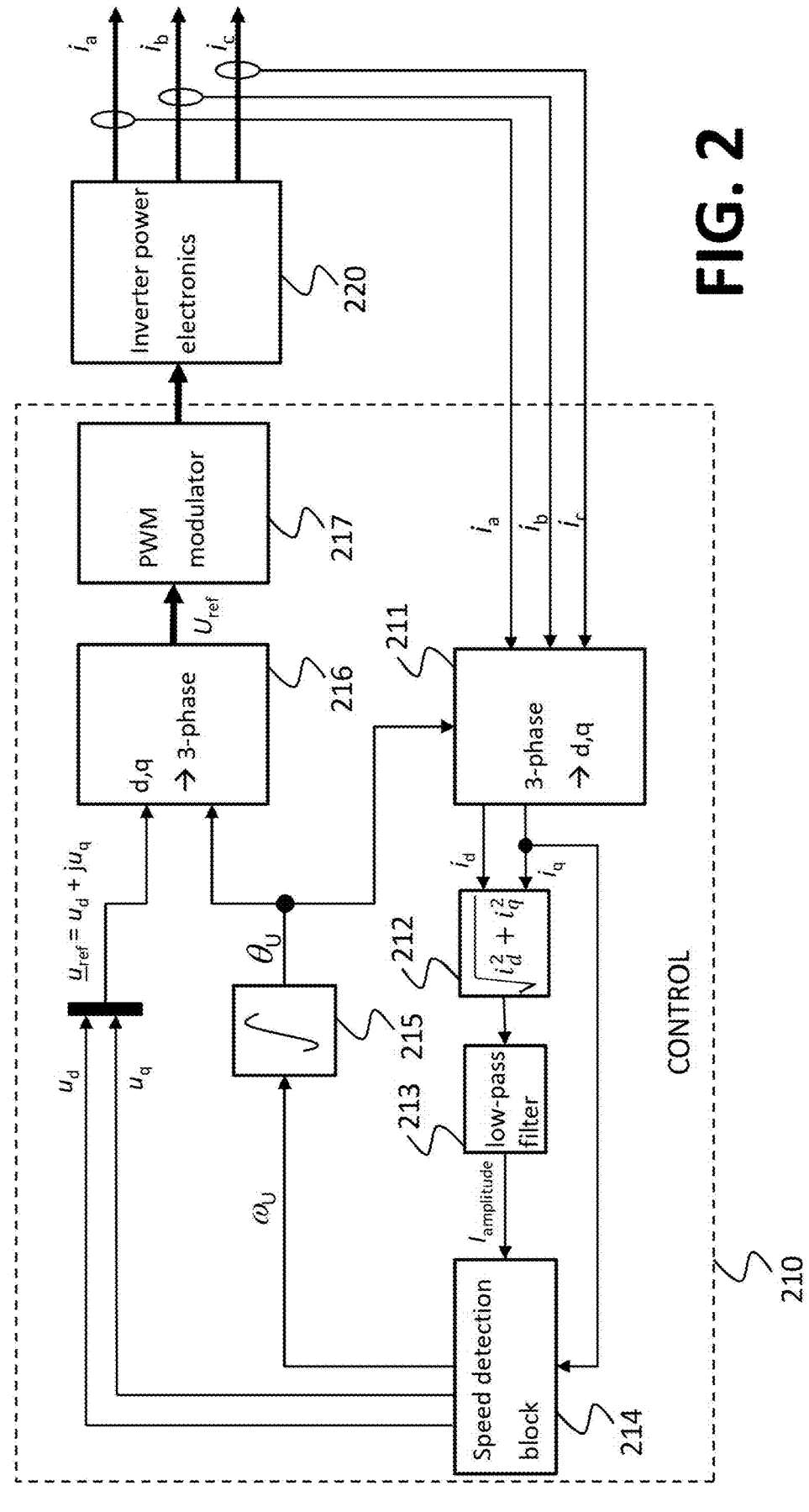
FIG. 2 illustrates a control system according to an embodiment.
Figure 3:
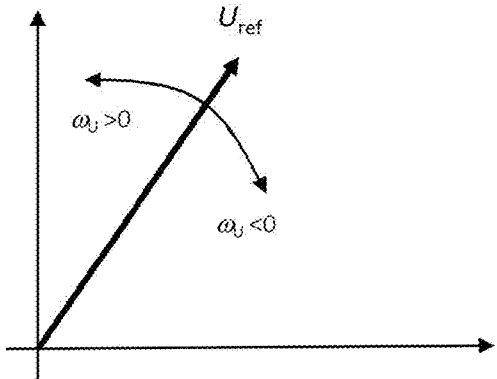
FIG. 3 illustrates a diagram according to an embodiment.

FIG. 2 illustrates the control arrangement 210 in more detail according to an embodiment. The simplified figure only shows elements necessary for understanding the various embodiments described herein. Consequently, the exemplary figure does not show e.g. all the functional elements possibly used for the normal control of the pump system when it has been started and the motor 120 and the pump 110 are being driven by the AC drive 20. In the example, the control of the AC drive may be generally implemented via a voltage reference (vector) $U_{ref}$ provided to a PWM modulator 217 for generating a control output to the inverter unit 220. In the control arrangement 210 shown in FIG. 2, the output phase currents $i_a$, $i_b$, $i_c$ of the inverter unit 220 are measured and converted from a three-phase abc reference frame into a rotating (moving) dq reference frame, in a manner known per se, by the abc to dq conversion block 211. Assuming that the phase currents $i_a$, $i_b$, $i_c$ are essentially symmetrical, it would be sufficient to measure only two of the output phase currents $i_a$, $i_b$, $i_c$ of the inverter unit 220 as the third current can be calculated from the other two. The rotating dq reference frame has a (direct) d-axis and a (quadrature) q-axis, wherein the q-axis is aligned with the supplied three-phase AC voltage as the conversion performed by the conversion block 211 is based on an angular position $\Theta_U$ of the voltage reference (vector) $U_{ref}$ and hence the resulting three-phase AC voltage supplied from the three-phase output of the inverter 220. In other words, the rotating dq reference frame rotates in sync with the three-phase AC voltage supplied from the three-phase output of the inverter 220. An output current amplitude $I_{amplitude}$ is calculated by block 212 filtered by a low-pass filter 213 and provided to a speed detection block 214, which also receives the quadrature current component directly from the conversion block 211. In the example of FIG. 2, the speed detection block 214 may be used for implementing some or all the control functionality of the various embodiments described herein. The speed detection block 214 then controls the voltage reference (vector) $U_{ref}$ via the respective component quantities (direct) $u_d$ and (quadrature) $u_q$ in the rotating dq reference frame. The voltage reference $U_{ref}$ in the abc reference frame is generated by the dq to abc conversion block 216 based on the angular position reference $\Theta_U$ of the voltage reference. The angular position reference $\Theta_U$ is obtained by an integrator 215 from an angular velocity reference (vector) $\omega_U$ provided by the speed detection block 214. It is noted that an absolute value (or magnitude) of the angular velocity $\omega$, i.e. angular speed (scalar), corresponds to a frequency of the voltage considering the direct relationship between an angular speed $|\omega|$ and a frequency (scalar) f: $|\omega|=2\pi f$. In practice, the angular velocity $\omega$ (also known as angular frequency vector), which is a vector quantity, can be treated as a signed quantity, whose magnitude is the angular speed (scalar with a positive or zero value) and sign indicates the direction of the rotation. For reference, FIG. 3 illustrates an example showing how the sign of the angular velocity reference $\omega_U$ indicates the direction of rotation of the voltage reference vector $U_{ref}$ and hence the resulting three-phase AC voltage supplied from the three-phase output of the inverter 220. A positive value (>0) of the angular velocity reference $\omega_U$ may be used for indicating an anti-clockwise (counterclockwise) rotation while a negative value (<0) can be used for indicating a clockwise rotation. The anticlockwise rotation and clockwise rotation of the voltage reference vector $U_{ref}$ may correspond to AC drive 20 output phase sequences a-b-c and c-b-a, respectively.

According to an embodiment, a solution is provided to estimate the motor 120 velocity, and thus also the pump 110 velocity (or speed), using the AC drive 20. The velocity estimation is described in more detail in the following. The thus estimated motor 120 velocity is then used for controlling the pump system.

According to an embodiment, the control in the AC drive 20 may employ a rotating dq reference frame, i.e. use a coordinate system where the q-axis is aligned with the AC drive's output voltage vector. The d-axis voltage component may be essentially zero but in some cases there can be also a d-axis voltage component as explained below. If the frequency (or equally the angular speed) of the AC drive's output voltage is varied, the following happens:

When the output voltage frequency is (clearly) higher than a rotor frequency of the motor, the motor is operating in a pull-out zone. The torque produced is very small and voltage is leading current. The power factor is very low but there is all the time positive a q-axis current component.

When the AC drive output voltage frequency approaches the motor rotor frequency, the power factor and torque increase and the real power increases.

When the AC drive output voltage frequency is the same as the motor rotor electrical frequency (rotor electrical frequency=p/2*rotor mechanical frequency, where p is the motor pole number), the power factor is now zero, and there is only reactive power. It means that the q-axis current component is zero. At this point, also total motor current amplitude is minimized.

When the AC drive output voltage frequency goes below the motor rotor frequency, there is a regenerating reactive power. The q-axis current is now negative.

Figure 4:
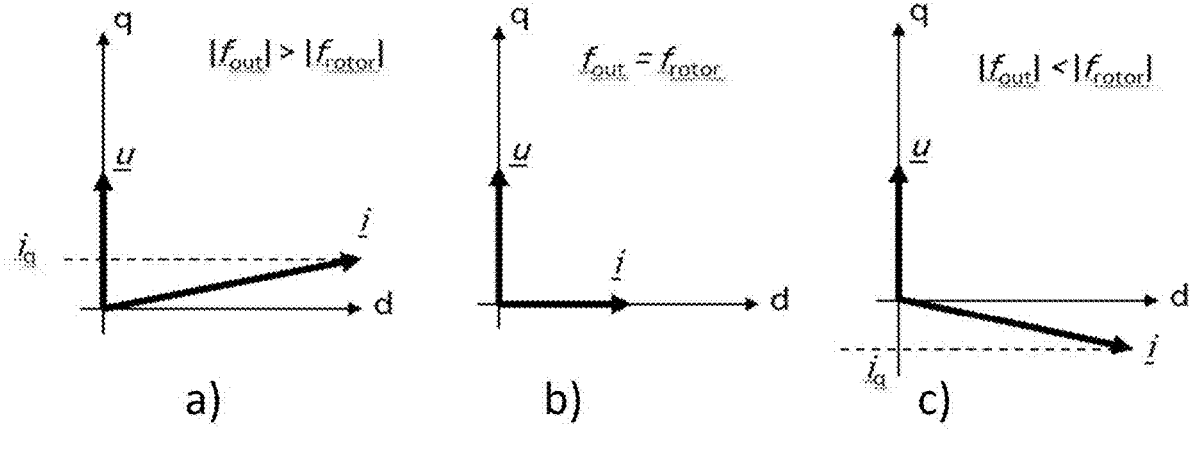
FIG. 4 illustrates a diagram according to an embodiment.

FIG. 4 shows a diagram according to an embodiment illustrating the above situations. In the figure, voltage and current vectors u and i are shown in three basic situations: a) the AC drive 20 output voltage rotates faster than the rotor of the motor 120, i.e. the output voltage frequency $|f_{out}|$ is clearly higher than rotor frequency $|f_{rotor}|$ b) output voltage rotates at the same speed as the rotor, i.e. the output voltage frequency $f_{out}$ is the same as the rotor frequency $f_{rotor}$, and c) the output voltage rotates slower than the rotor, i.e. the output voltage frequency $|f_{out}|$ is clearly lower than the rotor frequency $|f_{rotor}|$.

Figure 5:
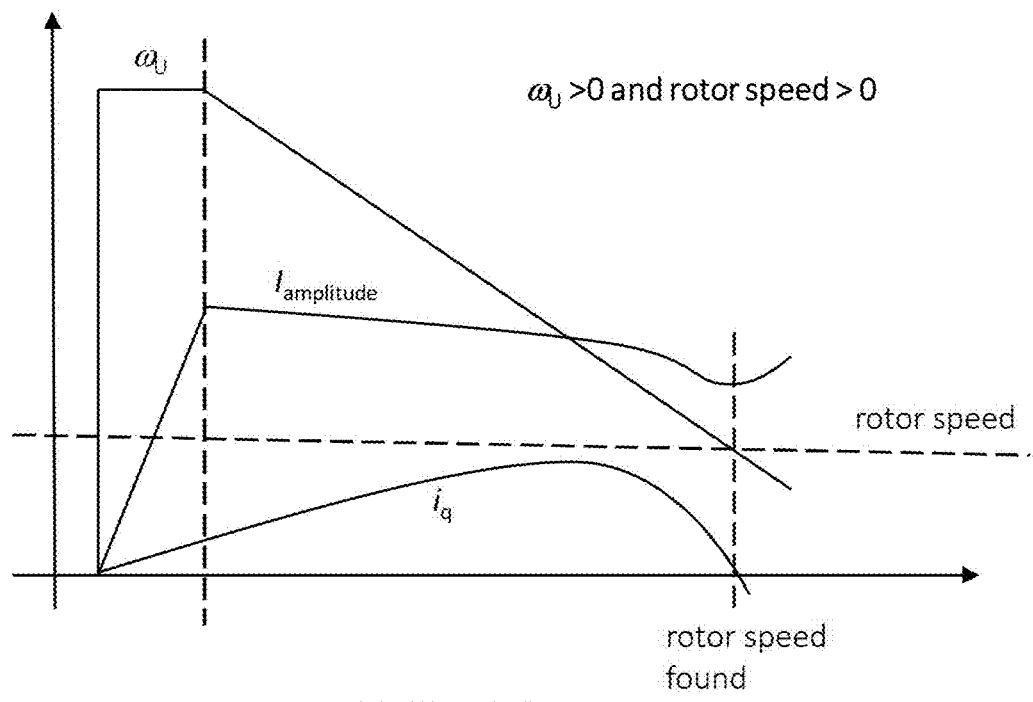
FIG. 5 illustrates a diagram according to an embodiment.

Consequently, by varying the frequency, or equally the angular speed or the angular velocity, of the AC drive's 20 output voltage, it is possible to estimate the motor 120 velocity and speed by detecting one or more predetermined characteristic in the output current of the AC drive 20. FIG. 5 shows an example, in which it can be seen how the q-axis current component $i_q$ goes to zero essentially at the same time as the angular velocity $\omega_U$ reference and thus the angular velocity of the AC drive's output voltage matches the rotor electrical angular velocity. Similarly, it can be seen how the output current amplitude $I_{amplitude}$ has a (local) minimum essentially at the same time as the angular velocity $\omega_U$ reference and thus the angular velocity of the AC drive's output voltage matches the rotor electrical angular velocity.

Figure 6:
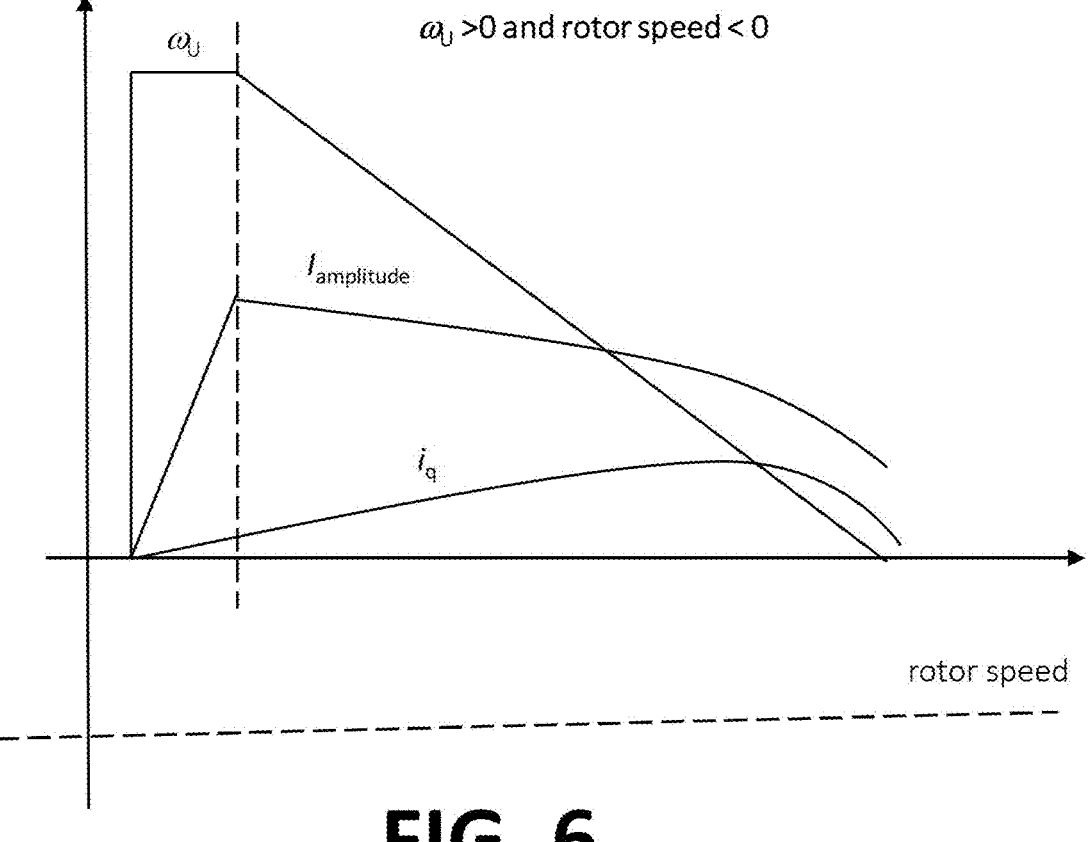
FIG. 6 illustrates a diagram according to an embodiment.

The disclosed solution can produce an estimate of the motor 120 rotor velocity only if the signs (directions) of the output voltage angular velocity and the rotor electrical angular velocity are the same. If they are not same, the result is always zero. Therefore, in order to get an estimate, it may be necessary to vary the output voltage of the AC drive 20 by using both positive and negative angular velocity values if the direction of rotation of the rotor of the motor 120 is not known before the test. FIG. 6 shows an example in which the signs of the output voltage angular velocity and the rotor electrical angular velocity are different and therefore the rotor velocity estimate cannot be obtained.

As an example, it is possible to feed variable frequency (or angular speed) 3-phase test voltage to the motor 120. Starting frequency can be the same as a maximum frequency of the application. The frequency can be ramped down towards zero frequency. The AC drive's 20 output currents may be measured, and they can be analyzed during the frequency scanning. And when the frequency of the test voltage is same as the rotor frequency, the special characteristics explained above can be observed in the measured currents. This means that the motor speed, and thus the pump speed can be detected by analyzing measured currents during the frequency scanning. In order not to produce torque in the motor, i.e. just to estimate the speed, it is preferable that the magnitude of the voltage used during the frequency scanning is smaller compared to a normal operation. As an example, the test voltage magnitude could be about 5% to 50% of the nominal operation voltage, or more preferably about 5% to 20% of the nominal operation voltage.

According to an embodiment, a method for operating a pump system is provided, wherein the pump system comprises a rotary pump 110, a three-phase induction motor 120 operably coupled to the rotary pump 110 to rotate the pump, and an AC drive 20 operably coupled to the induction motor 120 to control the motor. The method comprises estimating a rotational velocity of the induction motor 120. The estimating comprises supplying, by the AC drive 20, the induction motor 120 with a three-phase AC voltage at multiple different angular velocities, monitoring an output current of the AC drive 20 generated in response to the supplied voltage at the multiple different angular velocities, determining a angular velocity of the supplied voltage at which at least one predetermined characteristic in the monitored output current is detected, and determining a rotational velocity corresponding to the determined angular velocity as an estimate of the rotational velocity of the motor 120. The method further comprises operating the pump system on the basis of the determined estimate of the rotational velocity of the motor 120. The method may be computer implemented. According to an embodiment, the at least one predetermined characteristic comprises an amplitude of the output current reaching a minimum, when observed in the rotating dq reference frame having the d-axis and the q-axis, wherein the q-axis is aligned with the supplied three-phase AC voltage. According to an embodiment, the minimum is a local minimum. According to an embodiment, the at least one predetermined characteristic comprises a q-axis component of the output current being essentially zero, when observed in the rotating dq reference frame having the d-axis and the q-axis, wherein the q-axis is aligned with the supplied three-phase AC voltage. The at least one predetermined characteristics described herein may be observed either directly or indirectly e.g. via one or more quantities indicative thereof.

According to an embodiment, the supplying, by the AC drive 20, the induction motor with the three-phase AC voltage at the multiple different angular velocities may comprise starting from a predetermined maximum angular velocity and lowering the angular velocity towards zero at least until said at least one predetermined characteristic in the monitored output current is detected. It is also possible to start from zero angular velocity and increase the angular velocity towards the predetermined maximum angular velocity at least until said at least one predetermined characteristic in the monitored output current is detected. The predetermined maximum angular velocity may be the nominal angular velocity (or corresponding frequency value) of the motor 120 or any suitably selected value which may depend on the system characteristics. According to an embodiment, the starting from the predetermined maximum angular velocity and lowering the angular velocity towards zero is performed at least once (or several times) for both directions of rotation of the supplied three-phase AC voltage. In a similar manner, if starting from zero angular velocity and increasing the angular velocity towards the predetermined maximum angular velocity, it may be performed at least once (or several times) for both directions of rotation of the supplied three-phase AC voltage. According to an embodiment, it is also possible to vary the angular velocity in some other way, for example alternately increasing and decreasing the angular velocity, at least until the at least one predetermined characteristic in the monitored output current is detected. According to an embodiment, the decreasing or increasing, or generally the changing, of the angular velocity (equally angular speed) may be performed in a stepwise manner, wherein the step magnitude may be fixed or variable, for example.

Figure 7:
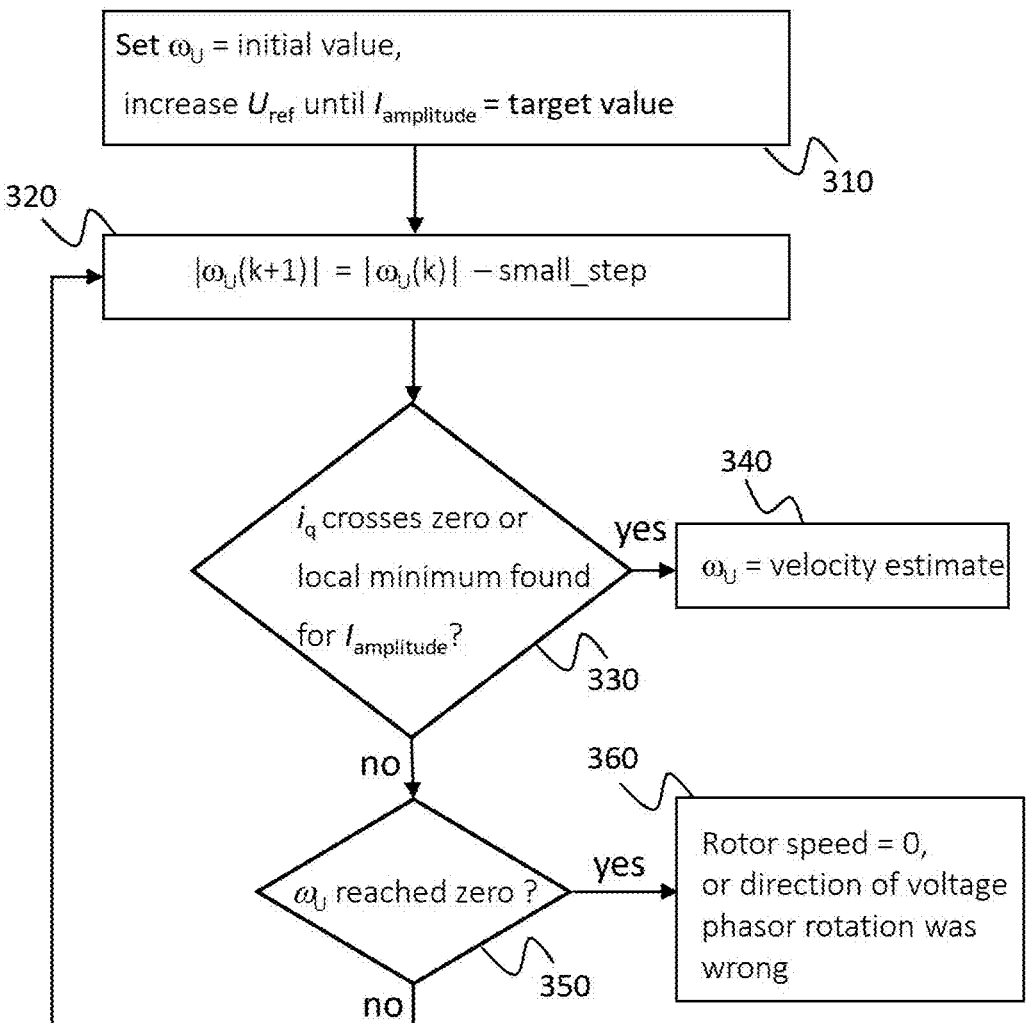
FIG. 7 illustrates a flow chart according to an embodiment.

FIG. 7 illustrates a flow chart showing the velocity estimation according to an embodiment. As an example, the speed detection block 214 in the example of FIG. 2 may be used for implementing at least part of the functionality shown in FIG. 7. In 310 the estimation is started by setting the angular velocity reference $\omega_U$ to an initial value and increasing the magnitude of the voltage reference $U_{ref}$ until the amplitude of the current $I_{amplitude}$ reaches a predetermined target value. In 320 the magnitude of the angular velocity reference, $|\omega_U|$, is decreased by a predetermined (small) step. In 330 it is determined whether at least one predetermined characteristic is detected. E.g. i, crosses zero or a (local) minimum is found for $I_{amplitude}$ ($\Delta i_{amplitude}/\Delta t>0$). If yes, then in 340 the present angular velocity reference $\omega_U$ is determined as the velocity estimate. If no, then in block 350 it is determined whether the angular velocity reference $\omega_U$ has reached zero value (or some other predetermined end point value). If no, then in 320 the magnitude of the angular velocity reference $|\omega_U|$ is decreased by a predetermined (small) step. If yes, then in 360 it is determined that the direction of the test output voltage rotation may have been wrong, i.e. the sign of the angular velocity reference $\omega_U$ has been wrong, whereby the procedure could be restarted from 310 but using the opposite sign for the angular velocity reference $\omega_U$.

As mentioned above, the d-axis voltage component and hence the d-axis component of the voltage reference, $u_d$, is usually zero. However, e.g. at low frequencies (below 5 Hz, for example), the d-axis voltage component can be used for fine tuning the instance of time when the q-axis component of the output current, $i_q$, crosses zero. In practice there may be some unknowns related to the electrical circuit, for example. As an example, the possible transformer may be blocking DC current and distorting low frequencies, typically 0 . . . 3 Hz. This may depend on the transformer characteristics and can't be modelled without knowing the transformer circuit details. Impedance of the circuit may also be unknown. Therefore, it is possible that the q-axis component of the output current, $i_q$, is crossing zero too early (test voltage frequency has not reached the true rotor frequency). It is also possible that the q-axis component of the output current, $i_q$, is not crossing zero at all. If the q-axis component of the output current, $i_q$, is not crossing zero at all or it is crossing zero too late, the estimated motor rotational velocity will be too low. To compensate for or remove this possible inaccuracy, the d-axis component of the voltage reference, $u_d$, can be increased at low frequencies. And if the q-axis component of the output current, $i_q$, crosses zero too early, the estimated motor rotational velocity will be too high. In such a case the d-axis component of the voltage reference, $u_d$, boost should preferably be smaller or zero.

According to an embodiment, the operating of the pump system on the basis of the determined estimate of the rotational velocity of the motor may comprise enabling a start of pumping by the pump system if an absolute value of the determined estimate of the rotational velocity of the motor is equal to or lower than a predetermined limit value and/or blocking the start of pumping by the pump system if the absolute value of the determined estimate of the rotational velocity of the motor exceeds the predetermined limit value. In case the determined estimate of the rotational velocity of the motor, and hence the pump, indicates that they are rotating too fast, it is possible to wait e.g. a predetermined period of time and then repeat the velocity estimation. The velocity estimation can then be repeated as many times as necessary until it is found that the motor speed, and hence the pump speed are low enough such that the pump system, i.e. the pumping by the pump system, can be safely started. The predetermined limit value for enabling and/or blocking the start of pumping by the pump system may be selected on the basis of the system characteristics, for example. The operating of the pump system on the basis of the determined estimate of the rotational velocity may be based on the determined estimate of the rotational velocity a such, if the direction of the rotation should be observed, for example. The operating of the pump system on the basis of the determined estimate of the rotational velocity may alternatively or additionally be based on the estimate of the rotational speed corresponding to the determined estimate of the rotational velocity a such, i.e. the absolute value of the rotational velocity, if the direction of the rotation does not need to be observed, for example. After the pumping has started, the normal control of the pump system, when it has been started and the motor 120 and the pump 110 are being driven by the AC drive 20, may be implemented by means of conventional scalar control, for example.

The control arrangement 20 and/or other means for implementing at least part of the functionality according to any one of the embodiments herein, or a combination thereof, may be implemented as one physical unit or as two or more separate physical units that are configured to implement the functionality. Herein the term 'unit' generally refers to a physical or logical entity, such as a physical device or a part thereof or a software routine. The control arrangement 20 and/or other means for implementing at least part of the functionality according to any one of the embodiments herein may be implemented at least partly by means of one or more computers or corresponding digital signal processing (DSP) equipment provided with suitable software, for example. Such a computer or digital signal processing equipment preferably comprises at least a working memory (RAM) providing storage area for arithmetical operations, and a central processing unit (CPU), such as a general-purpose digital signal processor. The CPU may comprise a set of registers, an arithmetic logic unit, and a control unit. The CPU control unit is controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the various embodiments, or a part thereof, may further comprise suitable input means for receiving e.g. measurement and/or control data, and output means for outputting e.g. control or any other data, such as the determined thermal load. It is also possible to use a specific integrated circuit or circuits, such as application-specific integrated circuits (ASIC), digital signal processing devices (DSPD), programmable logic devices (PLD), field-programmable gate arrays (FPGA) and/or discrete electric components and devices for implementing the functionality according to any one of the embodiments.

Many electric devices, such as electric power converters, and components thereof may comprise processors and memory that may be utilized in implementing the functionality according to the various embodiments described herein. Thus, at least some modifications and configurations possibly required for implementing an embodiment could be performed as software routines, which may be implemented as added or updated software routines. If at least part of the functionality of any of the embodiments is implemented by software, such software may be provided as a computer program product comprising computer program code which, when run on a computer, causes the computer or corresponding arrangement to perform the functionality according to the embodiments as described herein. Such a computer program code may be stored or generally embodied on a computer readable medium, such as suitable memory, e.g. a flash memory or an optical memory, from which it is loadable to the unit or units executing the program code. In addition, such a computer program code implementing any of the embodiments may be loaded to the unit or units executing the computer program code via a suitable data network, for example, and it may replace or update a possibly existing program code. An embodiment may provide a computer program embodied on any client-readable distribution/data storage medium or memory unit(s) or article(s) of manufacture, comprising program instructions executable by one or more processors/computers, which instructions, when loaded into an apparatus, constitute the control arrangement, or any corresponding unit or an entity providing corresponding functionality, or at least part of the corresponding functionality. Programs, also called program products, including software routines, program snippets constituting "program libraries", applets and macros, can be stored in any medium and may be downloaded into an apparatus. In other words, each or some or one of the possible units/sub-units and/or algorithms for one or more functions/operations described above, for example by means of any of FIGS. 1 to 7 and any combination thereof, may be an element that comprises one or more arithmetic logic units, a number of special registers and control circuits.

It will be obvious to a person skilled in the art that, as the technology advances, the inventive concept can be implemented in various ways. The invention and its embodiments are not limited to the examples described above but may vary within the scope of the claims.

The invention claimed is:

1. A method for operating a pump system, the pump system comprising a rotary pump, a three-phase induction motor operably coupled to the rotary pump to rotate the pump, and an AC drive operably coupled to the induction motor to control the motor, the method including:

estimating a rotational velocity of the motor, the estimating including:

supplying, by the AC drive, the induction motor with a three-phase AC voltage at multiple different angular velocities;

monitoring an output current of the AC drive generated in response to the supplied voltage at the multiple different angular velocities;

determining an angular velocity of the supplied voltage at which at least one predetermined characteristic in the monitored output current is detected; and determining a rotational velocity corresponding to the determined angular velocity as an estimate of the rotational velocity of the motor, and operating the pump system on the basis of the determined estimate of the rotational velocity of the motor.

2. The method of claim 1, wherein the operating the pump system on the basis of the determined estimate of the rotational velocity of the motor comprises enabling a start of pumping by the pump system if an absolute value of the determined estimate of the rotational velocity of the motor is equal to or lower than a predetermined limit value and/or blocking the start of pumping by the pump system if the absolute value of the determined estimate of the rotational velocity of the motor exceeds the predetermined limit value.

3. The method of claim 1, wherein the at least one predetermined characteristic comprises an amplitude of the output current reaching a minimum, when observed in a rotating dq reference frame having a d-axis and a q-axis, wherein the q-axis is aligned with the supplied three-phase AC voltage.

4. The method of claim 3, wherein the minimum is a local minimum.

5. The method of claim 1, wherein the at least one predetermined characteristic comprises a q-axis component of the output current being essentially zero, when observed in a rotating dq reference frame having a d-axis and a q-axis, wherein the q-axis is aligned with the supplied three-phase AC voltage.

6. The method of claim 1, wherein the supplying, by the AC drive, the induction motor with the three-phase AC voltage at the multiple different angular velocities comprises starting from a predetermined maximum angular velocity and lowering the angular velocity towards zero at least until said at least one predetermined characteristic in the monitored output current is detected.

7. The method of claim 6, wherein the starting from the predetermined maximum angular velocity and lowering the angular velocity towards zero is performed at least once for both directions of rotation of the supplied three-phase AC voltage.

8. A computer program product comprising program instructions stored in a non-transitory computer readable medium, which program instructions, when run by a computing apparatus controlling an AC drive which is operably coupled to a three-phase induction motor operably coupled to a rotary pump cause the computing apparatus to carry out the following:

estimate a rotational velocity of the motor, the estimating including:

supplying, by the AC drive, the induction motor with a three-phase AC voltage at multiple different angular velocities;

monitoring an output current of the AC drive generated in response to the supplied voltage at the multiple different angular velocities;

determining an angular velocity of the supplied voltage at which at least one predetermined characteristic in the monitored output current is detected; and determining a rotational velocity corresponding to the determined angular velocity as an estimate of the rotational velocity of the motor, and operate the pump system on the basis of the determined estimate of the rotational velocity of the motor.

9. An apparatus for operating a pump system, the pump system comprising a rotary pump, a three-phase induction motor operably coupled to the rotary pump to rotate the pump, and an AC drive operably coupled to the induction motor to control the motor, the apparatus having at least one processor and at least one memory storing computer program code which, when executed with the at least one processor, cause the apparatus to:

estimate a rotational velocity of the motor, the estimating including supplying, by the AC drive, the induction motor with a three-phase AC voltage at multiple different angular velocities;

monitoring an output current of the AC drive generated in response to the supplied voltage at the multiple different angular velocities;

determining an angular velocity of the supplied voltage at which at least one predetermined characteristic in the monitored output current is detected; and determining a rotational velocity corresponding to the determined angular velocity as an estimate of the rotational velocity of the motor, and operate the pump system on the basis of the determined estimate of the rotational velocity of the motor.

10. The apparatus of claim 9, wherein the apparatus is configured to operate the pump system on the basis of the determined estimate of the rotational velocity of the motor by enabling a start of pumping by the pump system if an absolute value of the determined estimate of the rotational velocity of the motor is equal to or lower than a predetermined limit value and/or by blocking the start of pumping by the pump system if the absolute value of the determined estimate of the rotational velocity of the motor exceeds the predetermined limit value.

11. The apparatus of claim 9, wherein the at least one predetermined characteristic comprises: an amplitude of the output current reaching a minimum, when observed in a rotating dq reference frame having a d-axis and a q-axis, wherein the q-axis is aligned with the supplied three-phase AC voltage, and/or a q-axis component of the output current being essentially zero, when observed in said rotating dq reference frame having the d-axis and the q-axis, wherein the q-axis is aligned with the supplied three-phase AC voltage.

12. The apparatus of claim 9, wherein the apparatus is configured to supply, by the AC drive, the induction motor with the three-phase AC voltage at the multiple different angular velocities starting from a predetermined maximum angular velocity and lowering the angular velocity towards zero at least until said at least one predetermined characteristic in the monitored output current is detected.

13. The apparatus of claim 12, wherein the apparatus is configured to perform the starting from the predetermined maximum angular velocity and lowering the angular velocity towards zero at least once for both directions of rotation of the supplied three-phase AC voltage.

14. The apparatus of claim 9, wherein the AC drive is configured to be operated in a scalar control mode.

15. The apparatus of claim 9, wherein the AC drive comprises at least one electric power converter.

16. The apparatus of claim 15, wherein the at least one electric power converter comprises an inverter.

17. An electric drive comprising an electric power converter configured to be operably coupled to an induction motor coupled to a rotary pump to rotate the pump, wherein the electric drive is configured to:

estimate a rotational velocity of the motor by:

supplying the induction motor with a three-phase AC voltage at multiple different angular velocities;

monitoring an output current of the electric drive gener-
ated in response to the supplied voltage at the multiple
different angular velocities;

determining an angular velocity of the supplied voltage at
which at least one predetermined characteristic in the
monitored output current is detected; and determining a rotational velocity corresponding to the
determined angular velocity as an estimate of the
rotational velocity of the motor, and operate the pump on the basis of the determined
estimate of the rotational velocity of the motor.

* * * * *